(12) United States Patent
Kwon et al.

(10) Patent No.: US 9,439,119 B2
(45) Date of Patent: *Sep. 6, 2016

(54) METHOD AND APPARATUS FOR PERFORMING HAND-OVER

(71) Applicant: SAMSUNG ELECTRONICS CO., LTD., Suwon-si (KR)

(72) Inventors: Hyuk-choon Kwon, Seoul (KR); Hae-young Jun, Seoul (KR); Ho-dong Kim, Gwacheon-si (KR); Dong-seek Park, Yongin-si (KR); Soo-yeon Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,170

(22) Filed: Dec. 23, 2013

(65) Prior Publication Data
US 2014/0112309 A1  Apr. 24, 2014

Related U.S. Application Data

(63) Continuation of application No. 13/034,124, filed on Feb. 24, 2011, now Pat. No. 8,638,754.

(60) Provisional application No. 61/308,081, filed on Feb. 25, 2010.

(30) Foreign Application Priority Data

Jun. 18, 2010 (KR) ........................ 10-2010-0058231

(51) Int. Cl.
*H04W 36/14* (2009.01)
*H04W 36/00* (2009.01)
(Continued)

(52) U.S. Cl.
CPC ............ *H04W 36/14* (2013.01); *H04W 36/00* (2013.01); *H04W 48/08* (2013.01); *H04W 48/16* (2013.01); *H04W 60/00* (2013.01)

(58) Field of Classification Search
CPC ... H04W 84/18; H04W 84/20; H04W 84/22; H04W 36/00
See application file for complete search history.

(56) References Cited

U.S. PATENT DOCUMENTS

2004/0198358 A1   10/2004   Kim et al.
2005/0075084 A1   4/2005    Salokannel et al.
(Continued)

FOREIGN PATENT DOCUMENTS

CN    101184093 A    5/2008
JP    2002-280925 A  9/2002
(Continued)

OTHER PUBLICATIONS

Search Report, dated Oct. 28, 2011, from the International Searching Authority, issued in counterpart Application No. PCT/KR2011/001310.
(Continued)

*Primary Examiner* — John Blanton
(74) *Attorney, Agent, or Firm* — Sughrue Mion, PLLC

(57) ABSTRACT

A method of performing hand-over in a personal basic service set (PBSS) including a plurality of stations and one coordinator is provided. An association request frame comprising PCP capability information, and requesting to associate to the PBSS, is received from each of the stations. The PCP capability information comprises information regarding at least one of whether each of the stations supports a power source capability of continuous power supply, whether each of the stations supports a channel time allocation function, and whether each of the stations supports a network clustering function. An association response frame, indicating whether the association request received from each of the stations is approved, is transmitted to each of the stations, and a priority to be a coordinator of the stations is determined based on the PCP capability information. Hand-over is performed with one of the stations according to the determined priority.

12 Claims, 5 Drawing Sheets

(51) Int. Cl.
*H04W 48/08* (2009.01)
*H04W 48/16* (2009.01)
*H04W 60/00* (2009.01)

(56) References Cited

U.S. PATENT DOCUMENTS

| | | | |
|---|---|---|---|
| 2005/0122944 A1 | 6/2005 | Kwon et al. | |
| 2008/0112364 A1* | 5/2008 | Kwon et al. | 370/331 |
| 2008/0247371 A1* | 10/2008 | Kwon et al. | 370/338 |
| 2009/0111532 A1* | 4/2009 | Salokannel et al. | 455/574 |
| 2009/0257397 A1* | 10/2009 | Kwak et al. | 370/331 |
| 2009/0257403 A1 | 10/2009 | Jeon et al. | |
| 2010/0074133 A1* | 3/2010 | Kim et al. | 370/252 |
| 2010/0216391 A1 | 8/2010 | Cho et al. | |
| 2011/0286424 A1 | 11/2011 | Jeon et al. | |
| 2012/0207135 A1 | 8/2012 | Jeon et al. | |

FOREIGN PATENT DOCUMENTS

| | | |
|---|---|---|
| JP | 2004-312729 A | 11/2004 |
| JP | 2005-006327 A | 1/2005 |
| JP | 2005-176356 A | 6/2005 |
| JP | 2006-333360 A | 12/2006 |
| JP | 2010-500846 A | 1/2010 |
| JP | 2010-504660 A | 2/2010 |
| KR | 1020080112174 A | 12/2008 |
| KR | 10-2009-0060399 A | 6/2009 |
| WO | 2008/026874 A2 | 3/2008 |
| WO | 2008/060099 A1 | 5/2008 |

OTHER PUBLICATIONS

Communication, dated May 24, 2013, issued by the Mexican Institute of Industrial Property in counterpart Mexican Patent Application No. MX/a/2012/008909.

Communication dated Jul. 31, 2013 issued by the Intellectual Property Office of Australia in counterpart Australian Patent Application No. 2011220645.

Communication from the Canadian Patent Office issued May 28, 2014 in a counterpart Canadian Application No. 2,791,029.

Communication dated Jun. 30, 2014 from the State Intellectual Property Office of P.R. China in a counterpart application No. 201180011036.4.

Cordeiro, et al.; "Implications of Usage Models on TGad Network Architecture", IEEE 802.11-09-0391r0, Mar. 11, 2009, 11 pages total.

Communication dated Oct. 28, 2014, issued by the Japanese Patent Office in counterpart Japanese Application No. 2012-554936.

Communication issued on Aug. 28, 2015 by the European Patent Office in related Application No. 11747732.3.

Communication dated Jun. 20, 2016, issued by the Korean Intellectual Property Office in counterpart Korean Application No. 10-2010-0058231.

\* cited by examiner

FIG. 4

| B11 | MEANING |
|---|---|
| 0 | BATTERY POWER |
| 1 | POWER LINE |

FIG. 5

| B11 | B12 | MEANING |
|---|---|---|
| 0 | 0 | BATTERY POWER |
| 0 | 1 | POWER LINE SUPPORTED |
| 1 | 0 | ONLY POWER LINE |
| 1 | 1 | RESERVED |

METHOD AND APPARATUS FOR PERFORMING HAND-OVER

CROSS-REFERENCE TO RELATED PATENT APPLICATION

This is a continuation of U.S. patent application Ser. No. 13/034,124, which claims priority from Korean Patent Application No. 10-2010-0058231, filed on Jun. 18, 2010, in the Korean Intellectual Property Office, and U.S. Provisional Patent Application No. 61/308,081, in U.S. Patent and Trademark Office, filed on Feb. 25, 2010, the disclosures of which are incorporated herein in their entirety by reference.

BACKGROUND

1. Field

Methods and apparatuses consistent with the exemplary embodiments relate to performing hand-over, and more particularly, to methods and apparatuses for performing hand-over in which hand-over between a coordinator and a station is performed according to a priority determined based on information regarding the capabilities of stations.

2. Description of the Related Art

A basic service set (BSS) in a wireless local area network (WLAN) is formed of one access point (AP) and a plurality of stations, wherein the stations always perform communication via the AP except in predetermined cases, such as a direct link setup (DLS) or a tunneled direct link setup (TDSL). The AP cannot transfer its AP function to a station.

A wireless personal area network (WPAN), unlike a BSS, is a network formed of a coordinator and a plurality of stations, in which communication may be performed between stations without having to use a coordinator that corresponds to an AP. Also, in a WPAN system, a station that has a function of operating as a coordinator may exist among other stations, and thus if a coordinator has to transfer its role to another station, the coordinator transfers its role to a station that is capable of operating as the coordinator. The transfer of the role of coordinator from one coordinator to another station is referred to as a hand-over.

SUMMARY

One or more exemplary embodiments provide methods and apparatuses for performing hand-over between a coordinator and a station according to a priority determined based on information regarding capabilities of stations.

According to an aspect of the exemplary embodiments, there is provided a hand-over method performed in a personal basic service set (PBSS) including a plurality of stations and one coordinator, the method comprising: receiving an association request frame requesting to associate to the PBSS that comprises PBSS control point (PCP) capability information regarding at least one of whether a station supports a power source, whether the station supports a channel time allocation function, and whether the station supports a network clustering function, from each of the stations; transmitting an association response frame indicating whether the association request received from each of the stations is approved, to each of the stations; determining a priority to be a coordinator of the stations based on the PCP capability information and broadcasting the determined priority to the stations, wherein the priority is determined in order to appoint a coordinator for the stations included in the PBSS; and performing hand-over between the coordinator and one of the stations according to the priority.

The hand-over method may further comprise: receiving the PCP capability information from each of the stations; and updating the priority of the stations based on the received PCP capability information and broadcasting the updated priority to the stations.

The PCP capability information may further comprise information on a maximum number of stations that can be associated to a station for each of the stations.

The information on whether each of the stations supports a power source may comprise one of information about whether each of the stations supports a battery-based, non-continuous power source, a continuous power source that is not based on a battery, or both a continuous power source that is not based on a battery and a battery-based, non-continuous power source.

In the determining of the priority, the priority may be determined in such a way that a station supporting a power source capable of continuous power supply has a priority higher than a station supporting a power source capable of non-continuous power supply, and that a station supporting a channel time allocation function has a priority higher than a station that does not support a channel time allocation function, and that a station supporting a network clustering function has a priority higher than a station that does not support a network clustering function.

The PCP capability information may further comprise group information about a first station group supporting a power source capable of continuous power supply, a second station group supporting a power source capable of non-continuous power supply, and a third station group supporting power sources of both continuous and non-continuous power supply, and the first station group comprises at least one of a portable device, a MP3 player, a portable multimedia player (PMP), a digital camera, and a digital camcorder, the second station group comprises at least one of a television, a set top box, a DVD player, a desktop player, and a projector, and the third station group comprises at least one of a laptop computer and a wireless docking device. However, the devices in the station groups are not limited thereto.

According to another aspect of the exemplary embodiments, there is provided an apparatus for performing hand-over in a personal basic service set (PBSS) including a plurality of stations and one coordinator, and mounted in the coordinator, comprising: a receiving unit receiving an association request frame requesting to associate to the PBSS that comprises PCP capability information regarding at least one of whether a station supports a power source capability, whether the station supports a channel time allocation function, and whether the station supports a network clustering function, from each of the stations; a transmitting unit transmitting an association response frame indicating whether the association request received from each of the stations is approved, to each of the stations; a priority determining unit determining a priority to be a coordinator of the stations included in the PBSS based on the PCP capability information received from the receiving unit, wherein the priority is determined in order to appoint a coordinator for the stations included in the PBSS; and a hand-over performing unit performing hand-over between the coordinator and one of the stations according to the priority after the transmitting unit has broadcast the determined priority to the stations.

According to another aspect of the exemplary embodiments, there is provided a computer readable recording medium having embodied thereon a program for executing a hand-over method performed in a personal basic service set (PBSS) including a plurality of stations and one coordinator, the method comprising: receiving an association request frame requesting to associate to the PBSS that comprises PCP capability information on at least one of whether a station supports a power source, whether the station supports a channel time allocation function, and whether the station supports a network clustering function, from each of the stations; transmitting an association response frame indicating whether the association request received from each of the stations is approved, to each of the stations; determining a priority to be a coordinator of the stations based on the PCP capability information and broadcasting the determined priority to the stations, wherein the priority is determined in order to appoint a coordinator for the stations included in the PBSS; and performing hand-over between the coordinator and one of the stations according to the priority.

BRIEF DESCRIPTION OF THE DRAWINGS

The above and other features will become more apparent by describing in detail exemplary embodiments thereof with reference to the attached drawings in which:

FIG. 4 is a schematic view for explaining a power source field according to an exemplary embodiment;

FIG. 5 is a schematic view for explaining a power source field according to another exemplary embodiment.

DETAILED DESCRIPTION OF THE EXEMPLARY EMBODIMENTS

Hereinafter, exemplary embodiments will be described with reference to the attached drawings.

Figure 1:
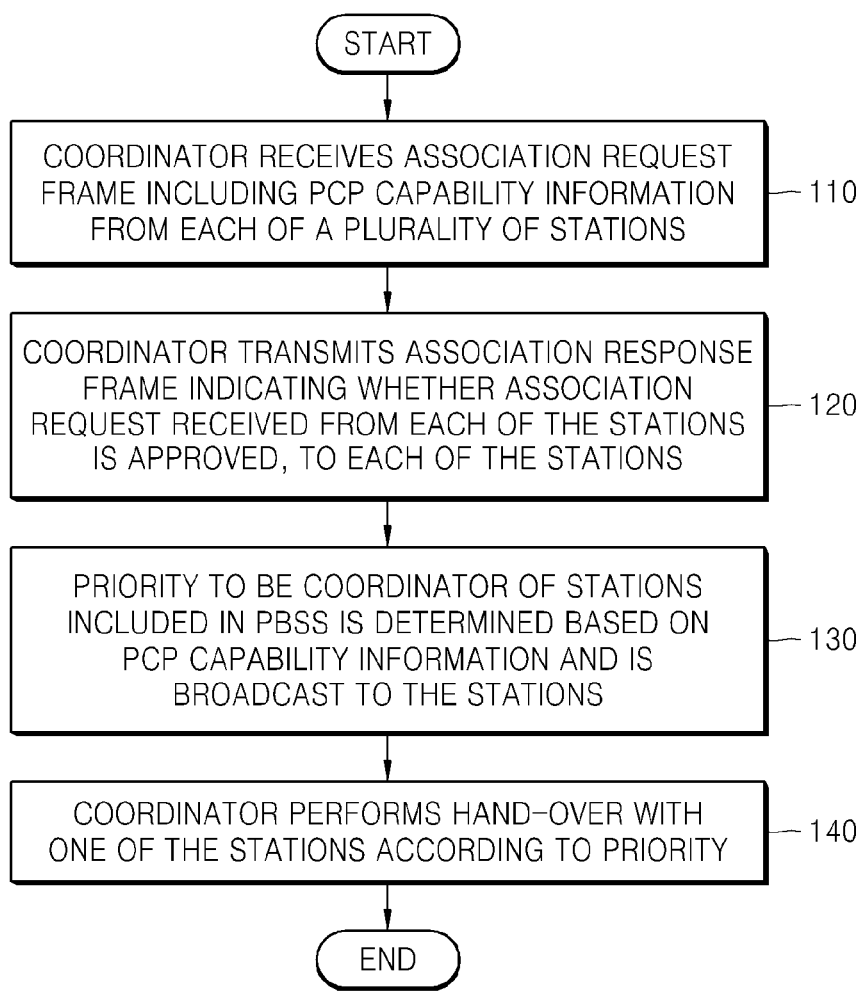
FIG. 1 is a flowchart illustrating a hand-over method according to an exemplary embodiment.

FIG. 1 is a flowchart illustrating a hand-over method according to an exemplary embodiment.

In operation 110, a coordinator receives an association request frame requesting to associate to a personal basic service sets (PBSS) that comprises PCP capability information regarding at least one of whether a station supports a power source capable of continuous power supply, whether the station supports a channel time allocation function, and whether the station supports a network clustering function, from each of a plurality of stations.

A PBSS, unlike a basic service set (BSS), refers to a network that is configured in such a way that, in principle, stations are capable of communicating with one another directly without using a coordinator that corresponds to an access point (AP) of the BSS, which is similar to a wireless personal area network (WPAN) system. However, a WPAN system is not connected to an external network, whereas a PBSS may be connected to an external network. In a PBSS, a coordinator may be referred to as a PBSS control point (PCP). Also, in PBSSs according to the current exemplary embodiment, a 60 GHz frequency band may be used for communication.

Additionally, a station supporting a channel time allocation function may allocate channel time to different stations if the station operates as a PCP, and may be referred to as a service period allocation function in another exemplary embodiment.

Also, a station supporting a network clustering function may allow a plurality of coordinators respectively belonging to a plurality of PBSSs to exchange network information with each another so as to operate the plurality of PBSSs together like one huge PBSS if the station operates as a PCP. A network clustering function may be referred to as a PCP clustering function in another exemplary embodiment.

A structure of the PCP capability information according to an exemplary embodiment will be described later with reference to FIG. 3.

In operation 120, the coordinator transmits an association response frame indicating whether the association request received from each of the stations is approved, to each of the stations.

In operation 130, the coordinator determines a priority to be a coordinator of the stations based on the PCP capability information, and broadcasts the priority to the stations. Here, the priority is determined in order to appoint a coordinator for the stations included in the PBSS.

The coordinator may determine that a station supporting a power source capable of continuous power supply has a priority higher than a station supporting a power source capable of non-continuous power supply, that a station in support of a channel time allocation function has a priority higher than a station not supporting a channel time allocation function, and that a station in support of a network clustering function has a priority higher than a station not supporting a network clustering function.

In operation 140, the coordinator performs hand-over with one of the stations according to the determined priority.

For example, the coordinator may perform hand-over with the station having the highest priority among the plurality of stations. That is, the original coordinator may hand over the role of coordinator to the station that has the highest priority.

As described above, the priority is determined based on the PCP capability information regarding at least one of whether the stations support a power source capable of continuous power supply, whether the stations support a channel time allocation function, and whether the stations support a network clustering function. The coordinator then performs hand-over according to the determined priority. Accordingly, the role of coordinator is handed over to a more appropriate station that may operate as a coordinator.

Figure 2:
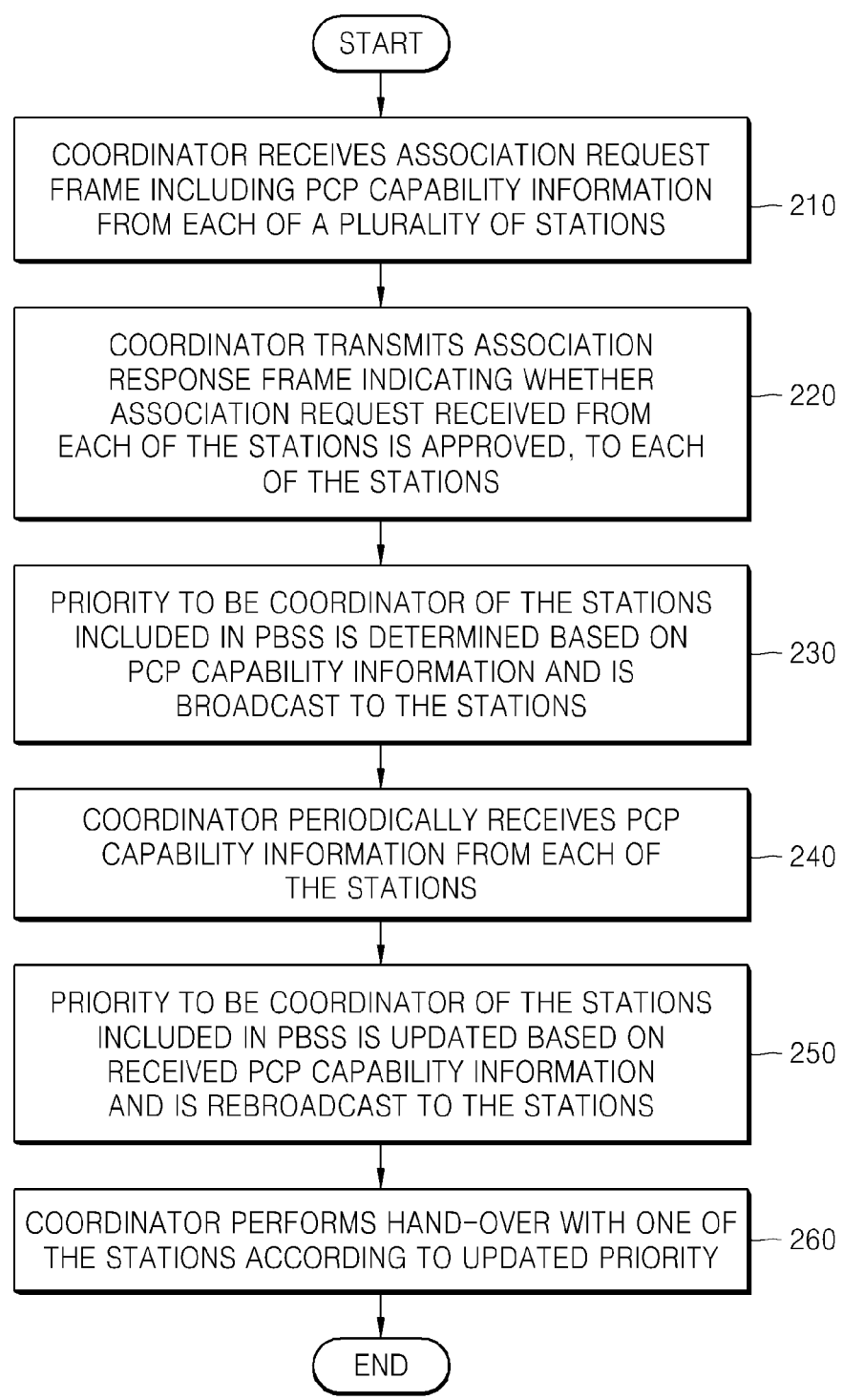
FIG. 2 is a flowchart illustrating a hand-over method according to another exemplary embodiment.

FIG. 2 is a flowchart illustrating a hand-over method according to another exemplary embodiment.

In operation 210, a coordinator receives an association request frame including PCP capability information from each of a plurality of stations.

In operation 220, an association response frame, indicating whether the association request received from each of the stations is approved, is transmitted to each of the stations.

In operation 230, priority to be a coordinator of the stations is determined based on the PCP capability information of the stations, and the priority of the stations is broadcast to the stations.

In operation 240, the PCP capability information is periodically received from each of the stations.

Operation 240 may be performed when the priority of the stations is already broadcast, but only when hand-over has not been performed. Thus, by periodically receiving the PCP capability information, the coordinator may periodically update information about whether the stations support a power source capable of continuous power supply, a channel time allocation function, and a network clustering function.

In operation 250, the coordinator updates the priority of the stations based on the periodically received PCP capability information and rebroadcasts the updated priority to the stations.

If newly received PCP capability information is from the same as previously received PCP capability information, the priority is not changed. However, if there is a difference between the newly received PCP capability information and the previously received PCP capability information, the priority may be changed according to the difference.

In operation 260, the coordinator performs hand-over with one of the stations according to the updated priority.

Figure 3:
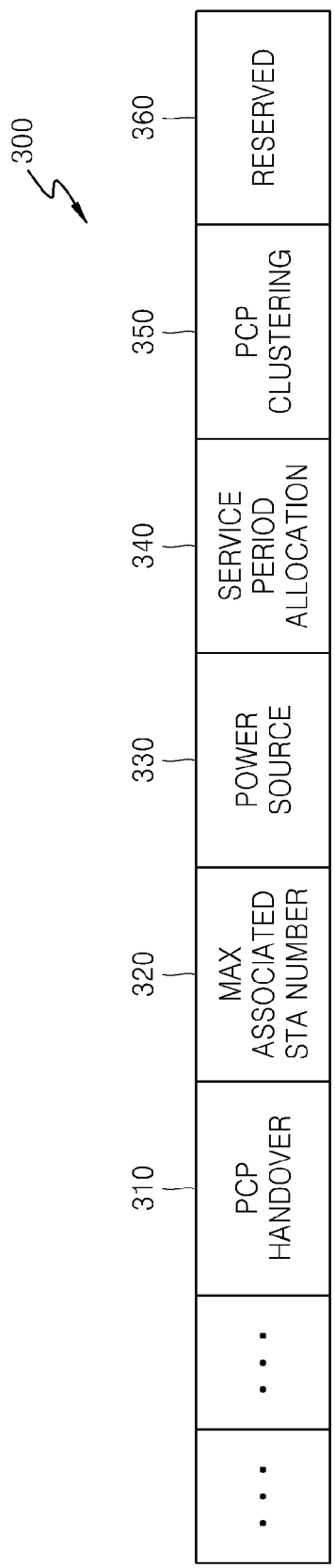
FIG. 3 illustrates a structure of PCP capability information according to an exemplary embodiment.

FIG. 3 illustrates a structure of PCP capability information 300 of a station according to an exemplary embodiment.

Referring to FIG. 3, the PCP capability information 300 includes a PCP hand-over field 310, a maximum number of associated stations field 320, a power source field 330, a service period allocation field 340, a PCP clustering field 350, and a reservation field 360.

The PCP hand-over field 310 indicates whether the station supports a hand-over function when the station operates as a coordinator. For example, when the PCP hand-over field 310 has a value of 1, a hand-over function is supported, and when it has a value of 0, a hand-over function is not supported.

The maximum number of associated station field 320 refers to a greatest number of stations that may be associated to the station when the station operates as a coordinator.

The power source field 330 indicates whether the station supports a power source capable of continuous power supply. The power source field 330 according to an exemplary embodiment will be described in detail with reference to FIGS. 4 and 5.

The service period allocation field 340 indicates whether the station may allocate a period section (or channel time) to other stations when the station operates as a coordinator.

The PCP clustering field 350 indicates whether the station may support a PCP clustering function (or a network clustering function) when the station operates as a coordinator. For example, when the PCP clustering field 350 has a value of 1, a PCP clustering function is supported. When the PCP clustering field 350 has a value of 0, a PCP clustering function is not supported.

The reservation field 360 is left blank for future use.

Meanwhile, according to another exemplary embodiment, the PCP capability information may further include group information (not shown) about a first station group supporting power sources capable of continuous power supply, a second station group supporting power sources capable of non-continuous power supply, and a third station group supporting power sources capable of both continuous and non-continuous power supply.

The first station group may include at least one of a portable device, a MP3 player, a portable multimedia player (PMP), a digital camera, and a digital camcorder, the second station group may include at least one of a television, a set top box, a DVD player, a desktop player, and a projector, and the third station group may include at least one of a laptop computer and a wireless docking device. However, the devices in the station groups are not limited thereto.

FIG. 4 is a schematic view which illustrates the power source field 330 according to an exemplary embodiment.

Referring to FIG. 4, when the power source field 330 has a value of 0, it indicates that the station supports a battery-based, non-continuous power source, and when the power source field 330 has a value of 1, it indicates that the station supports a continuous power source that is not based on a battery (power line-based power source).

FIG. 5 is a schematic view for explaining the power source field 330 according to another exemplary embodiment.

Referring to FIG. 5, when the power source field 330 has a value of 00, it indicates that the station supports a battery-based, non-continuous power source, and when the power source field 330 has a value of 01, it indicates that the station supports both a continuous power source that is not based on a battery (power line-based power source) and a battery-based, non-continuous power source. When the power source field 330 has a value of 10, it indicates that the station supports only a continuous power source that is not based on a battery. According to the exemplary embodiment of FIG. 5, when the power source field 330 has a value of 11, the power source field 330 is left blank for future use.

Figure 6:
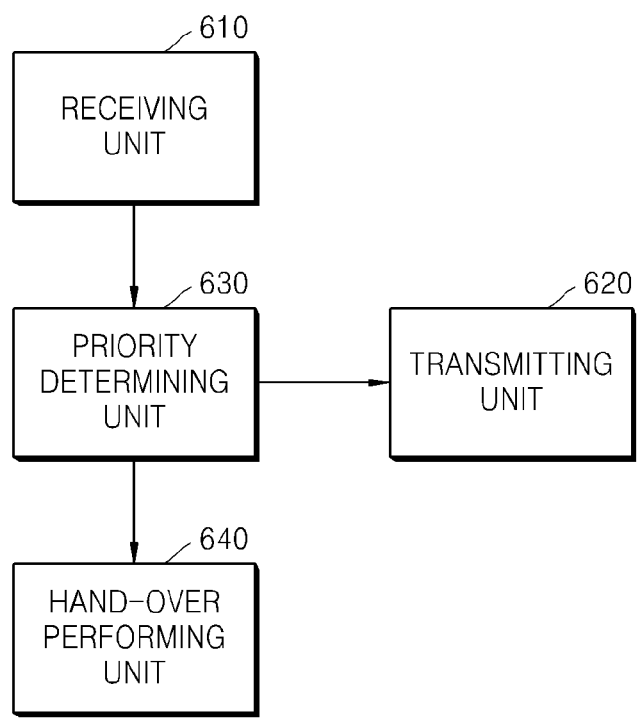
FIG. 6 is a schematic view illustrating an apparatus for performing hand-over, according to an exemplary embodiment.

FIG. 6 is a schematic view illustrating an apparatus for performing hand-over, according to an exemplary embodiment.

Referring to FIG. 6, the apparatus includes a receiving unit 610, a transmitting unit 620, a priority determining unit 630, and a hand-over performing unit 640. Here, the apparatus for performing hand-over is assumed to be mounted in a coordinator. However, according to another exemplary embodiment, the apparatus may be a coordinator.

The receiving unit 610 receives an association request frame requesting to associate to the PBSS. The association request frame comprises PCP capability information regarding at least one of whether a station supports a power source capable of continuous power supply, whether the station supports a channel time allocation function, and whether the station supports a network clustering function, from each of a plurality of stations.

The transmitting unit 620 transmits an association response frame to each of the stations indicating whether the association request received from each of the stations is approved.

The priority determining unit 630 determines a priority to be a coordinator for the stations included in the PBSS based on the PCP capability information received from the receiving unit 610. The transmitting unit 620 then broadcasts the determined priority to the stations.

After the transmitting unit 620 broadcasts the determined priority to the stations, the hand-over performing unit 640 performs hand-over with one of the stations according to the determined priority.

Meanwhile, according to another exemplary embodiment, the receiving unit 610 may receive new PCP capability information from each of the stations before the hand-over performing unit 640 performs hand-over. When the receiving unit 610 receives the new PCP capability information from each of the stations, the priority determining unit 630 updates the priority of the stations, and the transmitting unit 620 rebroadcasts the updated priority to the stations, and the hand-over performing unit 640 may perform hand-over with one of the stations according to the updated priority.

The exemplary embodiments can be written as computer programs and can be implemented in general-use digital computers that execute the programs using a computer readable recording medium.

Examples of the computer readable recording medium may include, but are not limited to, magnetic storage media (e.g., ROM, floppy disks, hard disks, etc.), and optical recording media (e.g., CD-ROMs, or DVDs).

While the inventive concept has been particularly shown and described with reference to exemplary embodiments thereof, it will be understood by those skilled in the art that various changes in form and details may be made therein without departing from the spirit and scope of the exemplary embodiments as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the exemplary embodiments.

What is claimed is:

1. A hand-over method performed in a personal basic service set (PBSS) including a plurality of stations and one original coordinator, the method comprising:
   receiving an association request frame comprising PBSS control point (PCP) capability information from each of the plurality of stations, the association request frame requesting to associate to the PBSS;
   transmitting an association response frame to each of the stations indicating whether the association request received from each of the stations is approved;
   determining a priority to be a new coordinator of the plurality of stations based on the PCP capability information, wherein the priority is determined in order to appoint the new coordinator for the plurality of stations included in the PBSS; and
   performing hand-over between the original coordinator and one of the plurality of stations according to the determined priority,
   wherein the PCP capability information comprises information regarding whether each of the plurality of stations is, or is not, a battery-based power source, and
   wherein the PCP capability information further comprises information regarding a maximum number of stations that can be associated to each of the stations.

2. The hand-over method of claim 1, wherein the PCP capability information comprises information regarding whether the station supports a channel time allocation function, and whether the station supports a network clustering function.

3. The hand-over method of claim 2, further comprising:
   receiving the PCP capability information from each of the stations; and
   updating the priority of each of the stations based on the received PCP capability information, and
   broadcasting the updated priority to each of the stations.

4. The hand-over method of claim 2, wherein, in the determining of the priority, the priority is determined so that a station supporting a power source capable of continuous power supply has a priority higher than a station supporting a power source capable of non-continuous power supply, and
   a station supporting a channel time allocation function has a priority higher than a station that does not support a channel time allocation function, and
   that a station supporting a network clustering function has a priority higher than a station that does not support a network clustering function.

5. The hand-over method of claim 2, wherein the PCP capability information further comprises group information about a first station group supporting a power source capable of continuous power supply, a second station group supporting a power source capable of non-continuous power supply, and a third station group supporting power sources of both continuous and non-continuous power supply, and
   the first station group comprises at least one of a portable device, a MP3 player, a portable multimedia player (PMP), a digital camera, and a digital camcorder,
   the second station group comprises at least one of a television, a set top box, a DVD player, a desktop player, and a projector, and
   the third station group comprises at least one of a laptop computer and a wireless docking device.

6. The hand-over method of claim 1, wherein the PCP capability information further comprises group information about a first station group supporting a power source capable of continuous power supply, a second station group supporting a power source capable of non-continuous power supply, and a third station group supporting power sources of both continuous and non-continuous power supply, and
   the first station group comprises at least one of a portable device, a MP3 player, a portable multimedia player (PMP), a digital camera, and a digital camcorder,
   the second station group comprises at least one of a television, a set top box, a DVD player, a desktop player, and a projector, and
   the third station group comprises at least one of a laptop computer and a wireless docking device.

7. An apparatus for performing hand-over in a personal basic service set (PBSS) including a plurality of stations and one original coordinator, and mounted in the coordinator, comprising:
   a receiver which receives an association request frame which comprises PBSS control point (PCP) capability information from each of the plurality of stations, the association request frame requesting to associate to the PBSS;
   a transmitter which transmits an association response frame to each of the stations which indicates whether the association request received from each of the stations is approved;
   a priority determining device which determines a priority to be a new coordinator of the plurality of stations included in the PBSS based on the PCP capability information received from the receiving unit, wherein the priority is determined in order to appoint the new coordinator for the plurality of stations included in the PBSS; and
   a hand-over performing device which performs hand-over between the original coordinator and one of the plurality of stations according to the determined priority after the transmitting unit has broadcast the determined priority to the plurality of stations,
   wherein the PCP capability information comprises information regarding whether each of the plurality of stations is, or is not, a battery-based power source, and
   wherein the PCP capability information further comprises information regarding a maximum number of stations that can be associated to each of the stations.

8. The apparatus of claim 7, wherein the PCP capability information comprises information regarding whether the station supports a channel time allocation function, and whether the station supports a network clustering function.

9. The apparatus of claim 8, wherein, when the receiver receives the PCP capability information from each of the stations, the priority determining device updates the priority of each of the stations based on the received PCP capability information, and
   the transmitter broadcasts the priority to the each of the stations, and the hand-over performing device performs hand-over with one of the plurality of stations according to the updated priority.

10. The apparatus of claim 8, wherein the priority determining device determines the priority so that a station supporting a power source capable of continuous power supply has a priority higher than a station supporting a power source capable of non-continuous power supply,
   a station supporting a channel time allocation function has a priority higher than a station that does not support a channel time allocation function, and
   a station supporting a network clustering function has a priority higher than a station that does not support a network clustering function.

11. The apparatus of claim 8, wherein the PCP capability information further comprises group information about a first station group supporting a power source capable of continuous power supply, a second station group supporting a power source capable of non-continuous power supply, and a third station group supporting power sources of both continuous and non-continuous power supply, and
   the first station group comprises at least one of a portable device, a MP3 player, a portable multimedia player (PMP), a digital camera, and a digital camcorder,
   the second station group comprises at least one of a television, a set top box, a DVD player, a desktop player, and a projector, and
   the third station group comprises at least one of a laptop computer and a wireless docking device.

12. A non-transitory computer readable recording medium having embodied thereon instructions that, when executed by a computer causes the computer to perform a hand-over method performed in a personal basic service set (PBSS) including a plurality of stations and one original coordinator, the method comprising:
   receiving an association request frame comprising PBSS control point (PCP) capability information from each of the plurality of stations, the association request frame requesting to associate to the PBSS;
   transmitting an association response frame to each of the stations indicating whether the association request received from each of the stations is approved;
   determining a priority to be a new coordinator of the plurality of stations based on the PCP capability information, wherein the priority is determined in order to appoint the new coordinator for the plurality of stations included in the PBSS; and
   performing hand-over between the original coordinator and one of the plurality of stations according to the determined priority,
   wherein the PCP capability information comprises information regarding whether each of the plurality of stations is, or is not, a battery-based power source, and
   wherein the PCP capability information further comprises information regarding a maximum number of stations that can be associated to each of the stations.

* * * * *